April 5, 1938.  R. G. DE LA MATER  2,113,109
HYDRODYNAMIC BRAKE MECHANISM
Filed Feb. 10, 1936  4 Sheets-Sheet 1

Inventor
ROBERT G. DELAMATER
By 
Attorney

April 5, 1938.  R. G. DE LA MATER  2,113,109

HYDRODYNAMIC BRAKE MECHANISM

Filed Feb. 10, 1936  4 Sheets-Sheet 4

Inventor
ROBERT G. DELAMATER
By C. L. Parker
Attorney

Patented Apr. 5, 1938

2,113,109

UNITED STATES PATENT OFFICE 2,113,109

HYDRODYNAMIC BRAKE MECHANISM

Robert Griffin De La Mater, Parkersburg, W. Va., assignor to The Parkersburg Rig & Reel Company, Parkersburg, W. Va., a corporation of West Virginia Application February 10, 1936, Serial No. 63,240

38 Claims. (Cl. 188—90)

This invention relates to hydrodynamic brake mechanisms, and is an improvement over the structures described and claimed in my prior Patents Nos. 1,992,911 and 1,992,912, granted February 26, 1935.

In the prior patents referred to I have disclosed several types of hydrodynamic brakes including the use of stator and rotor elements having coacting pockets containing a liquid adapted to absorb a substantial amount of the energy of the rotor so as to exert a retarding force thereagainst. The prior structures referred to may be generally employed where the use of a brake of this character is desired, although they were particularly designed for use in connection with oil well drilling apparatus, in which use they are highly efficient.

In my copending application Serial No. 61,231, filed January 28, 1936, I have disclosed a highly perfected type of hydrodynamic brake which possesses a high degree of flexibility of control, thus adapting it for a wide variety of uses, such as braking means for heavy trucks, buses, etc. In such use, the brake structure shown in my copending application referred to is highly efficient as means for limiting the speed of a vehicle when desired, for example, in descending long grades. The brake possesses the highly desirable characteristic of being subject to control by the operator to provide any desired braking action as determined by given conditions of operation.

In the structure of my copending application referred to, several means are disclosed for providing the desirable flexibility of operation. For example, the apparatus embodies such features as control valves for governing the admission of braking liquid into the brake casing and into the fluid pockets, control valves for governing the discharging of fluid from the stator pockets to the brake casing, means for evacuating the brake structure when no braking action is desired, etc.

An important object of the present invention is to provide a brake structure adapted for the same general uses as the structure of the copending application referred to, but wherein a substantially different means is employed for varying the braking action.

A further object is to provide a novel brake structure of the character referred to wherein the braking action is controlled by increasing or decreasing the rate of discharge of the liquid radially outwardly between the rotor and stator elements.

A further object is to provide a brake of the character referred to wherein the braking action is governed by varying the space between the rotor and stator.

A further object is to provide novel means for effecting relative axial movement between the rotor and stator to thus determine the amount of effective fluid within the brake whereby the braking action may be varied as desired.

A further object is to provide control means of the character referred to embodied in conjunction with liquid supply means whereby the supplying of liquid to the brake also may be utilized for governing the braking action.

A further object is to provide governing means for the braking action in conjunction with means for venting the brake casing to the atmosphere to facilitate the complete evacuation of the casing when it is desired to render the brake completely inoperative.

A further object is to provide novel governing means of the character referred to in combination with novel means for governing the admission of liquid into the pockets of the rotor and stator elements.

Other objects and advantages of the invention will become apparent during the course of the following description.

In the drawings I have shown several embodiments of the invention. In this showing.

Figure 1:
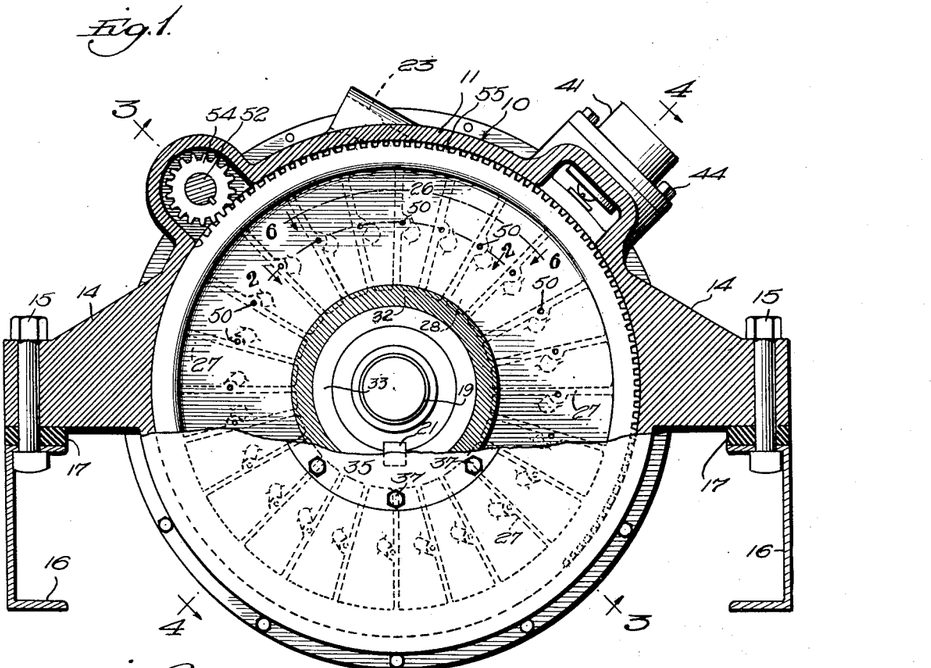
Figure 1 is a sectional view through the brake mechanism taken transversely of the axis thereof substantially on line 1—1 of Figure 3, parts being shown in elevation and parts being broken away.
Figure 2:
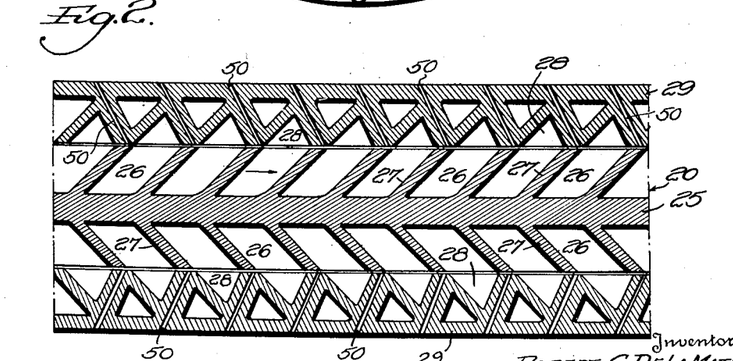
Figure 2 is a section taken substantially as indicated by the line 2—2 of Figure 1, showing a development of the stator and rotor pockets with respect to each other.
Figure 3:
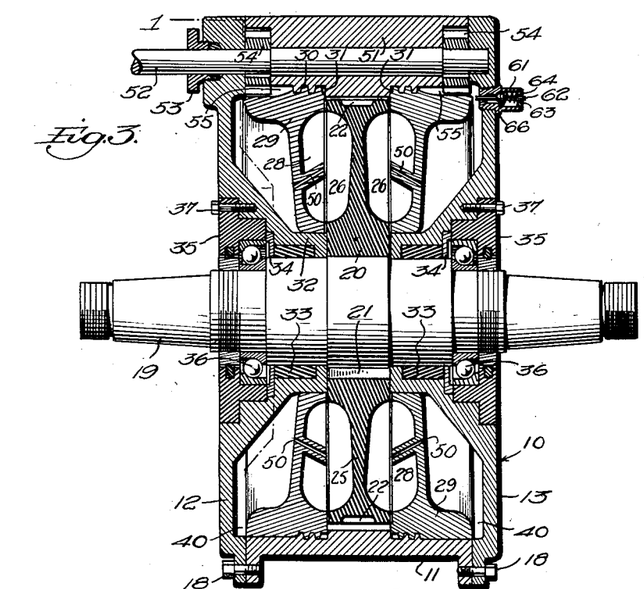
Figure 3 is a section on line 3—3 of Figure 1.

Referring to Figures 1, 2, and 3, the numeral 10 designates the brake casing as a whole, comprising a generally cylindrical center section 11 and end sections 12 and 13. The center section 11 is shown as being provided with horizontally extending arms 14 bolted as at 15 to supporting frames 16, rubber or similar cushioning elements 17 preferably being interposed between the ends of the arms 14 and the supporting frame members. These frame members are the side members of a motor vehicle chassis, but it is pointed out that while the present invention is capable of general application, it is particularly intended for use in connection with motor vehicles.

The casing sections are secured together by suitable bolts 18, thus forming, in effect, a single casing in which the braking elements are contained. A shaft 19 extends through the casing and has its ends suitably formed to be coupled to forward and rear sections of the vehicle drive shaft. It will be apparent, however, that the shaft 19 may be driven from any suitable rotating part of the vehicle, or may be connected to any rotating part of any apparatus in connection with which the braking action is desired. A rotor 20 is keyed as at 21 to the shaft 19 and is concentric therewith. However, the shaft 19 preferably has its axis arranged slightly above the axis of the casing, and accordingly the rotor 20 is slightly eccentric with respect to the casing. Accordingly the clearance between the rotor and the casing section 11 is greater at the bottom of the brake than at the top thereof, and this arrangement facilitates the pumping action of the rotor and the evacuation of the brake, and will be referred to later.

Figure 4:
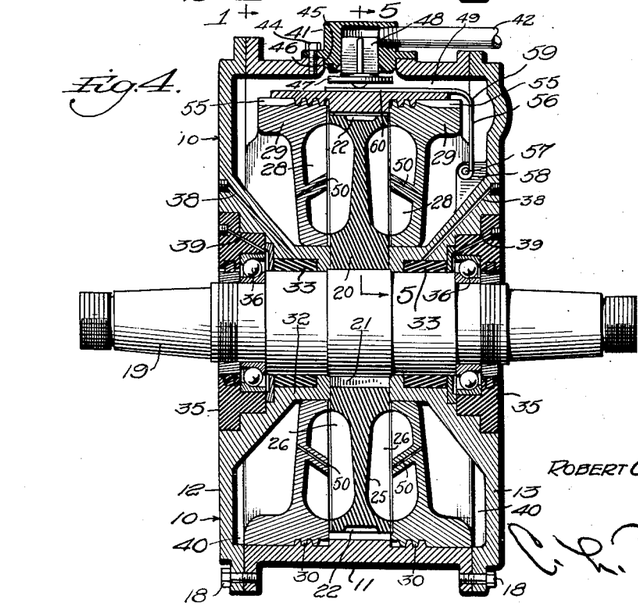
Figure 4 is a similar view on line 4—4 of Figure 1.
Figures 5, 6, 7, 9:
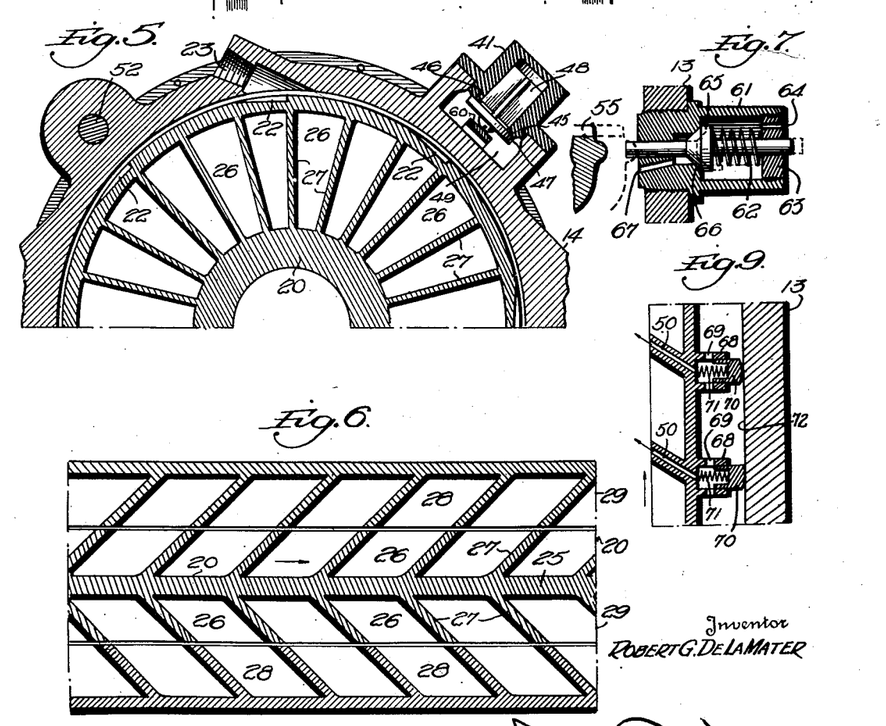
Figure 5 is an enlarged fragmentary sectional view of the upper portion of the brake taken substantially centrally of the width thereof on a plane at right angles to the axis of the brake.
Figure 6 is a sectional view similar to Figure 2 taken as indicated substantially on the line 6—6 of Figure 1.
Figure 7 is a detail sectional view of the vent valve and associated parts.
Figure 9 is a detail sectional view taken substantially as indicated by the line 9—9 of Figure 8 showing two of the inlet valves and associated elements.
Figure 14:
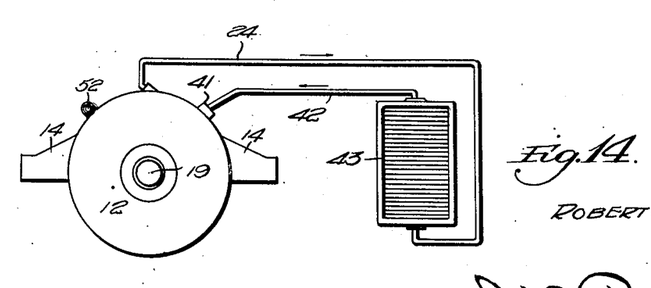

The periphery of the rotor is provided with pockets 22 formed as shown in Figures 3, 4, and 5, to generate a pumping action tending to move liquid in the casing toward the top thereof to be discharged through an opening 23. This action maintains a circulation of liquid through the brake when the latter is in operation and effects the evacuation of the brake when the latter is rendered inoperative by the control means to be described. The outlet passage 23 is connected to a pipe 24 as shown in Figure 14. The rotor 20 is provided with a center wall 25 and opposite faces of the rotor are provided with pockets 26 divided by walls or vanes 27, as shown in Figures 2 and 6. These pockets directly communicate with similar pockets 28 formed in the inner faces of stator members 29. The stator members are mounted for rotation and axial movement with respect to the rotor by means of relatively heavy threads 30 formed respectively in the periphery of the stator members and within opposite ends of the center casing section 11.

The adjacent faces of the rotor and stator members are arranged as close together as is practicable, and the movement of the stator members axially toward the rotor is limited by shoulders 31 formed in the casing section 11. When the stators are in engagement with the shoulders, the spaces between the rotor and stator elements are arranged the minimum distance apart, and this distance may be increased by imparting rotational movement to the stator elements, as will become apparent. The space between the rotor and the casing 11 constitutes a chamber receiving fluid passing radially outwardly between the rotor and stator members.

The coacting liquid pockets 26 and 28 incline away from the center of the rotor in the direction of rotation of the latter as indicated in Figures 2 and 6. The vanes dividing the pockets can extend substantially radially as indicated in Figures 1 and 5. The latter arrangement, however, may be modified in a manner to be referred to later.

Each of the casing sections 12 and 13 is provided with an inwardly extending annular flange 32 forming a supporting bearing for the adjacent stator member, these bearings permitting axial movement of each of the stator members away from the rotor in a manner to be described. Each of the end casing sections is provided with suitable packing 33 to eliminate leakage of the braking liquid along the shaft 19. Each packing is retained by a gland 34 which is engageable by a retaining ring 35 carrying anti-friction bearings 36, as shown in Figures 3 and 4. The retaining rings 35 are secured to the respective casing sections by suitable bolts 37. The packing elements 33 and bearings 36 may be supplied with lubricant through suitable passages 38 and 39 respectively.

Each casing section 12 and 13 is provided with a fluid space 40, as shown in Figures 3 and 4, and each of these spaces is annular, as will be apparent. At one point in its periphery, the casing section 11 is provided with means for introducing braking liquid into the spaces or passages 40. Referring to Figures 4 and 5, the numeral 41 designates a valve housing secured to the casing section 11 and connected to a fluid supply pipe 42 through which braking liquid is supplied to the spaces 40. The pipes 24 and 42 lead to a heat exchanger 43 (Figure 14) which preferably also is employed as a reservoir for the circulating liquid. Hydrodynamic brakes develop a substantial degree of heat in the braking liquid, as is well known, and the heat exchanging means 43 is included in the circulating system for the brake to minimize the temperature of the circulating liquid. In the case of a motor vehicle installation, the heat exchange means may be the usual vehicle radiator or it may be a supplemental radiator provided solely for the purpose of cooling the braking liquid.

The valve housing 41 is bolted to the casing section 11 as at 44 and a portion of the housing 41 projects into an opening 45 in the casing section 11 and terminates in a valve seat 46. This seat is engageable by a valve 47 carried by a guide 48 operable in the housing 41. The valve 47 controls the admission of liquid into a transverse passage 49 communicating with the liquid spaces 40.

Each of the stator elements is provided with a plurality of inlet tubes 50, preferably formed integral therewith, and adapted to permit the flow of liquid from the spaces or passages 40 into the rotor and stator pockets, the flow of liquid being induced by operation of the rotor, as will become apparent. As shown in Figures 1, 3, and 4, the inlet tubes have their longitudinally inner ends inclined radially outwardly with respect to the axis of rotation of the rotor. As indicated in Figures 1 and 2, the longitudinally inner ends of the inlet tubes are also inclined in the direction of rotation of the rotor. In the form of the invention shown in Figures 1 to 6 inclusive, the inlet tubes 50 are not provided with any control valve means, but such means may be employed if desired and is described later in connection with a modified form of the invention.

The casing section 11 is provided near the top thereof with a bearing boss 51 rotatably supporting a control shaft 52, and this shaft may be rotated by any suitable means (not shown), extending to a convenient point of operation, such as a point adjacent the driver's seat when the brake is used on a motor vehicle. The end of the shaft 52 to which the operating means is connected extends through the casing section 12 and the latter is provided with a suitable stuffing box 53 to prevent leakage of liquid around the shaft.

A pair of pinions 54 is keyed or otherwise secured to the shaft 52. Each of these pinions meshes with the teeth of a segment gear 55 formed in the periphery of one of the stator elements. These segment gears are arranged axially outwardly of the threads 30 and are relatively longer than the teeth of the pinions to permit axial movement of the stator elements upon rotation of the shaft 52.

It will be apparent that rotation of the shaft 52 transmits rotational movement to the stator elements and that these elements partake of axial movement due to their threaded connection with the casing. This axial movement determines the escape of liquid from the rotor and stator pockets and is utilized for governing the admission of liquid into the casing. Referring to Figure 4, the numeral 56 designates a relatively stiff leaf spring having one end pivotally connected as at 57 to a boss 58 formed integral with the casing section 13. The spring 56 is bent intermediate its ends as at 59 and has its free end 60 engageable with the valve 47 to close the latter when the stator adjacent the spring 56 moves axially away from the rotor.

The closing of the valve 47 and the axial movement of the stator elements away from each other evacuate the brake and render it inoperative, and valve means is provided for preventing the creation of a partial vacuum within the brake, tending to prevent the complete evacuation thereof. Referring to Figures 3 and 7, the numeral 61 designates a valve housing which may be threaded in a suitable opening in the casing section 13. The valve casing 61 slidably carries a valve stem 62 therein. The inner end of the valve casing 61 serves as a guide for the inner end of the valve stem 62, and the outer end of the latter is slidable in a plug 63 vented to the atmosphere as at 64. The stem 62 carries a valve 65 urged longitudinally inwardly by a spring 65' and engageable with a seat 66, and when the valve is open, the interior of the valve housing communicates with the interior of the casing through a port 67. The inner end of the stem 62 is engaged by the adjacent stator element whereby the latter, upon movement away from the rotor, unseats the valve 65.

Figure 8:
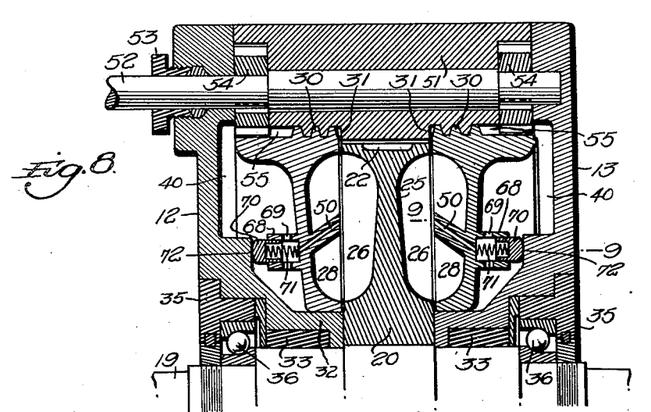
Figure 8 is a fragmentary sectional view similar to the upper portion of Figure 3 showing a modified form of the invention.

In the modified form of the invention shown in Figures 8 and 9 valve means is employed for controlling the admission of fluid into the inlet tubes 50. Each of the stator members may be provided with a preferably integral valve housing 68 projecting therefrom and provided with inlet openings 69. The outer end of each housing 68 is open and slidably receives a valve 70 having a spring 71 urging it outwardly into engagement with an annular ring 72 preferably formed integral with the casing section 13. The valves 70 and associated parts may be identical with each other as indicated in Figure 9, in which case they will be simultaneously opened and closed at the same rate upon axial movement of the stator elements.

Figure 10:
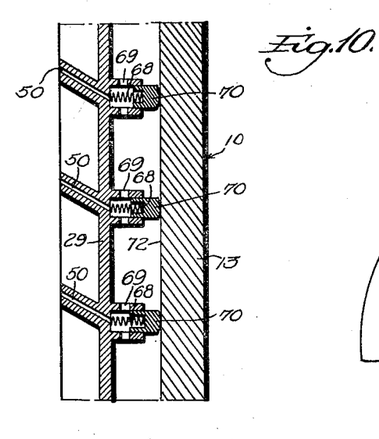
Figure 10 is a similar view showing a slightly modified arrangement of the inlet valves.

The form of the invention shown in Figure 10 is identical with that shown in Figure 9 except that the valves 70 are made slightly different from each other. The same results may be obtained by varying the ports 69 in the valve housing 68. The valves 70 may be of slightly varying lengths so that the valves progressively reach the entirely closed positions instead of being simultaneously operated at the same rate as in the form of the invention shown in Figures 8 and 9.

Figure 11:
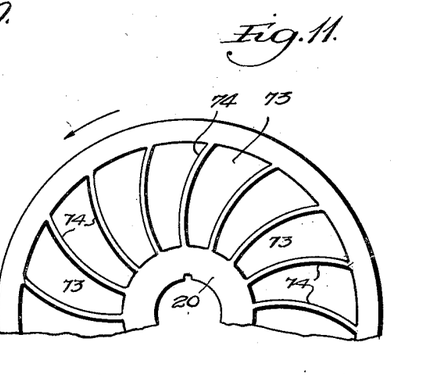
Figure 11 is a fragmentary elevation showing a modified form of rotor and stator pockets.

In the forms of the invention previously described, the pockets in the rotor and stator are substantially radial. A somewhat modified form of the invention is illustrated in Figure 11, which may be either the rotor or the stator. In this case the pockets 73 are formed between vanes 74 which are curved from end to end. The outer ends of the vanes 74 curve backward with respect to the direction of rotation, and this construction increases the velocity of the braking liquid, as will become apparent, thus increasing the maximum braking capacity.

Figure 12:
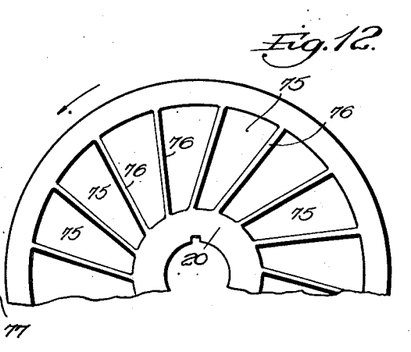
Figure 12 is a similar view showing a further modification of the same.

In Figure 12 a further modification is illustrated which is applicable to both the rotor and stator, wherein pockets 75 are formed between vanes 76 which are straight and are inclined radially outwardly opposite to the direction of rotation. This construction also increases the liquid velocity and the brake capacity in the same manner as the structure shown in Figure 11.

Figure 13:
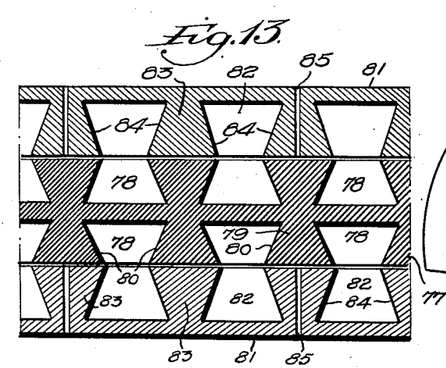
Figure 13 is a sectional view similar to Figure 2, showing a modified form of rotor and stator for providing a braking action upon rotation of the rotor in either direction, and, Figure 14 is a diagrammatic view illustrating the circulating system for the brake.

In Figure 13 of the drawings a brake structure is shown for use where the brake is required to develop resistance in either direction of rotation. In this form of the invention a rotor 77 is illustrated as being provided in opposite faces with pockets 78. In the other forms of the invention described the vanes separating the pockets of the rotor have parallel opposite faces. The form of the invention shown in Figure 13, however, provides separating walls 79 between the pockets having oppositely inclined faces 80, the width of each pocket increasing toward the center of the rotor. When the rotor is rotating in a direction corresponding to movement of the rotor to the left as viewed in Figure 13, the right hand faces 80 of the pockets 78 transmit movement to the braking liquid to generate necessary liquid velocity for the braking action. When the rotor rotates in the opposite direction, the left hand faces 80 of the rotor pockets perform the same function.

The stators 81 in Figure 13 are similarly constructed, the pockets 82 thereof being separated by walls 83 having oppositely inclined faces 84 to respectively act on the braking liquid dependent upon the direction of rotation of the rotor. Each wall 83, or certain of these walls, may be provided with liquid inlet passages 85 corresponding to the tubes 50 previously described, except that the passages 85 are arranged in planes radial with respect to the axis of rotation. The passages 85, however, slope toward their inner ends radially outwardly with respect to the axis of the brake, and accordingly the rotor is operative for inducing a flow of liquid through these passages.

The operation of the form of the invention shown in Figures 1 to 7 inclusive is as follows:

As previously stated, the present construction is adapted for any use in which a hydrodynamic brake is practicable, as in oil well drilling equipment wherein it is desirable to reduce the excessive wear on friction brakes. Such use of the brake is disclosed in my prior patents referred to. The flexibility of control of the present construction renders it particularly adapted for use on heavy motor vehicles such as trucks and buses. It is proposed, of course, that vehicles retain the present types of friction brakes for bringing the vehicles to a complete stop, the present apparatus being adapted only for retarding the movement of the vehicle or for determining a maximum rate of movement and thus materially save wear and tear on the friction brakes.

For example, the present construction is particularly intended for limiting the speed of heavy vehicles when descending grades without the necessity for the driver having to constantly employ the conventional friction brakes for this purpose. In descending long grades, as in hilly and mountainous country, the friction brakes of motor vehicles are subject to rapid wear and destruction due to the heat generated in the brakes. The present construction requires that the friction brakes be used only when a vehicle is to be brought to a stop.

When the present invention is used in connection with motor vehicles the brake mechanism may be supported in the manner suggested in Figure 1. The shaft 19 may be coupled in the vehicle propeller shaft or may be suitably driven from any rotating part of the vehicle. The mounting of the brake is such that the shaft 19, and consequently the rotor 20, will be driven at a speed proportionate to the speed of rotation of the vehicle wheels.

When the brake is functioning to retard the vehicle speed, the parts will be in the positions shown in Figure 4, the stator elements being at their axially inner limit of movement with the inlet valve 47 in open position. The vent valve 65 will be closed as shown in Figure 3, and as shown in solid lines in Figure 7. Under such conditions the brake will be effecting its maximum braking action. The radially outward flow of liquid in the rotor pockets 26 induces a flow of liquid from the passages 50 into the pockets of the rotor, and the leakage of liquid radially outwardly between the adjacent faces of the rotor and stator elements is at a minimum, and accordingly the maximum amount of liquid will remain in the rotor and stator pockets to effect the maximum braking action at the particular speed of rotation of the rotor.

Of course, there is a constant leakage of liquid radially outwardly between the adjacent faces of the rotor and stator which is more than compensated for by the flow of liquid into the brake through the inlet tubes 50, and the liquid flowing outwardly between the rotor and stator elements is pumped from the brake by means of the pumping action of the rotor and the discharge pipe 24. The provision of the pockets 22 in the periphery of the rotor and the eccentric mounting of the latter facilitates the pumping action and maintains a constant circulation of liquid through the brake. The heat generated by the brake is dissipated by means of the heat exchanger 43 through which the liquid flows from the pipe 24, the liquid being returned to the brake through the pipe 42 and thence into the passage 40, since the valve 47 is open under the conditions being considered.

In operation, the brake elements per se comprising the rotor 20, stators 29 and the pockets in these elements, function as fully described in my prior patents referred to and need not be described at substantial length herein. It will be apparent that the operation of the rotor generates centrifugal force in the liquid of the pockets 26, thus creating a radial flow of this liquid to the radially outer ends of the pockets 26 from whence the fluid is discharged into the radially outer portions of the pockets 28. These pockets are stationary, and accordingly it will be apparent that they overcome the inertia of the liquid and react therethrough to retard the rotational speed of the rotor. As the liquid reaches the radially inner limits of the pockets 28, the fluid is discharged into the corresponding ends of the pockets 26, the vanes between the latter pockets cutting through the flowing liquid.

It requires substantial energy to again set the liquid into rotary and radial motion, and the action of the braking means therefore is to retard the rotation of the rotor 20. The degree to which the braking action takes place depends, of course, on the total amount of fluid in the pockets of the rotor and stator and the speed of rotation of the shaft 19. Any desired retarding action may be readily accomplished up to a given maximum for a given vehicle speed by increasing up to the maximum the amount of fluid contained within the rotor and stator pockets. Beyond such point the braking action will increase upon the increased speed of rotation of the shaft 18, it being known that in a brake of this type the braking action increases as the square of the speed of rotation of the rotor.

The foregoing description covers generally the operation of the brake working at full capacity at any given rotational speed. If the braking action thus provided is excessive under a given condition, it readily may be reduced merely by rotating the shaft 52 by the operating means (not shown) provided for such purpose. Rotation of the shaft 52 in one direction rotates the stator elements, which action is accompanied by the transmission of axial movement of the stator elements away from the rotor by virtue of the threaded connection between the stator members and the casing section 11. It will be apparent that the brake operates at its highest efficiency under any given conditions when the rotor and stator elements are arranged in close proximity and the braking action is reduced by moving the stator elements to increase the space between these elements and the rotor.

The operation referred to increases the flow of liquid radially outwardly between the adjacent faces of the rotor and the stators, thus increasing the liquid discharge from the brake through the opening 23 and pipe 24 by the pumping action of the rotor. Further rotational movement may be imparted to the stators to effect further axial movement thereof away from the rotor, and under such conditions the spring 56 (Figure 4) will be engaged by the adjacent stator member to progressively close the valve 47 and thus reduce the supply of liquid to the passages 40. By increasing the discharging of the liquid from the brake pockets and by progressively reducing the rate of flow of liquid into the passages 40, the operator gradually reduces the amount of braking liquid within the rotor and stator pockets and otherwise reduces the braking action by moving the stator elements away from the rotor, until a point is reached at which the desired braking action is obtained.

The brake may be rendered completely inoperative by continuing the operation just referred to. In other words, rotation of the shaft 52 may be continued until the stator members have been moved the maximum distance from the rotor. At such time, the discharging of liquid from the brake pockets will take place at a maximum rate. During the operation referred to the spring 56 will be further actuated by the adjacent stator to completely close the valve 47 and thus prevent the entrance of any liquid into the brake. The apparatus is so constructed that the valve 47 will reach closed position shortly before the stators have been moved the maximum distance away from the rotor so that the last increment of movement of the stator member adjacent the spring 56 will place the latter under substantial tension to maintain the valve 47 tightly against its seat and insure the cutting off of the liquid supply.

The brake is thus rendered inoperative by cutting off the liquid supply and by so positioning the parts that the pumping action of the rotor will completely evacuate the rotor and stator pockets. In order to prevent the possibility of trapping liquid within the brake due to the creation of a partial vacuum therein incident to the evacuation of the brake, the vent valve 65 is provided. At the point where the inlet valve 47 reaches closed position, the adjacent stator member contacts with the inner end of the valve stem 62, and slight further movement of this stator member unseats the valve 65 and thus vents the casing to the atmosphere. When the brake is inoperative, therefore, atmospheric pressure is present in the brake and the creation of a partial vacuum therein is prevented. In most installations this valve is wholly unnecessary, and is provided solely as means for positively insuring the complete evacuation of the rotor and stator pockets.

From the foregoing it will be apparent that any desired braking action may be obtained, up to a maximum point for any given rotational speed, in which latter case the rotor and stator pockets will contain the maximum amount of braking liquid. Moreover, the brake may be rendered completely inoperative by closing the liquid supply and completely evacuating the rotor and stator pockets. Under all conditions, when the brake is operated, the rotor acts as a pump to circulate liquid through the brake. The peripheral pockets 22 assist in causing the liquid passing outwardly between the adjacent faces of the rotor and the stators to rotate at the same speed as the rotor, thus creating centrifugal force in the liquid to discharge it through the opening 23. The pumping action of the rotor and its pockets is increased by the eccentric mounting of the rotor, the space between the rotor and the casing 11 decreasing toward the outlet opening 23 to tend to place the liquid under pressure to assist in discharging it. The same pumping means operates to evacuate the brake when the latter is rendered inoperative in the manner previously described.

The operation of the form of the invention shown in Figures 8 and 9 is identical with that previously described with the exception of the controlling of the admission of liquid from the passages 40 into the rotor and stator pockets. As the stator elements move inwardly to decrease the space between the adjacent faces of the rotor and stator members and thus increase the braking action, the ports 69 are progressively opened by the valve 70 to permit a progressively increasing rate of flow of liquid into the pockets. Conversely, when the brake action is reduced by moving the stator elements axially away from the rotor, the ports 69 are progressively closed. As the stator elements are rotated, the outer ends of the valves 70 slide against the bearing face 72 and accordingly the valves themselves do not move axially. The valve housings 68, however, partake of movement together with the stator members, and the rate of communication through the ports 69 is thus controlled. These ports are completely closed when the brake is inoperative and the stator members are moved the maximum distance away from the rotor.

In the form of the invention shown in Figures 8 and 9 the valves 70 and their housings 68 are identical in construction and arrangement of parts and accordingly they function identically. In the form of the invention shown in Figure 10, the valves 70 have been indicated as being of slightly different lengths so that one or more of the valves will first start its movement toward closed position, followed progressively by the remaining valves. This construction is provided merely to increase to some extent the degree of flexibility of control. The same result may be obtained by altering the ports 69 instead of employing valves 70 of slightly different lengths.

In Figures 11 and 12 of the drawings, modified forms of rotor and stator pockets have been illustrated and such forms may be employed where it is desired to increase the maximum braking action. In both Figures 11 and 12, the pockets are inclined toward their outer ends backward with respect to the direction of rotation, and it has been found that such construction increases the velocity of the braking liquid for a given rotor speed, thus increasing the capacity of the brake.

Figure 13 of the drawings illustrates an optional arrangement of rotor and stator pockets and associated elements which may be utilized for developing a braking action upon rotation of the rotor in either direction. The pockets of both the stator and rotor have inclined side walls as previously described whereby the coacting pockets are adapted to generate a liquid flow to provide a braking action regardless of the direction of rotation. In order that the flow of braking liquid may be induced by rotation of the rotor in either direction, the inlet passages 85 are arranged in planes passing through the axis of rotation. These passages however, are inclined radially outwardly toward their longitudinally inner ends in order that the induction of liquid into the rotor pockets may be effected.

In each form of the invention the stator members may be removed for replacement in the event of breakage or for replacement with stators of different types. The threaded connection of the stator members with the casing section 11 permits the ready removal of the stator members, as will be apparent.

In view of the foregoing it will be apparent that the present construction provides a highly efficient braking action, thus rendering the apparatus applicable for use with heavy motor vehicles to permit a retarding of the speed thereof without or prior to application of the conventional friction brakes. The use of the brake is particularly advantageous in maintaining the vehicle speed below a given maximum when descending long grades, thus relieving the conventional friction brakes of the wear which is most destructive to them. The brake structure shown and described is highly flexible in its control, and the functionings of the various control elements are subject to operation through a common operating member, namely, the shaft 52.

It is to be understood that the forms of the invention herewith shown and described are to be taken as preferred examples of the same and that various changes in the shape, size and arrangement of parts may be resorted to without departing from the spirit of the invention or the scope of the subjoined claims.

I claim:

1. A hydrodynamic brake comprising a rotor and a stator provided with coacting fluid pockets, means for supplying fluid to said pockets, means for varying the supply of fluid to said pockets, and means for varying the discharge of fluid radially directly from said pockets.

2. A hydrodynamic brake comprising a rotor and a stator provided with coacting fluid pockets, means for supplying fluid to said pockets, means for varying the supply of fluid to said pockets, means for varying the discharge of fluid radially directly from said pockets, and common operating means for said last two means.

3. A hydrodynamic brake comprising a rotor and a stator provided with coacting fluid pockets, means for supplying fluid to said pockets, means for varying the supply of fluid to said pockets, and means for varying the rate of discharge of fluid radially directly from said pockets between said rotor and said stator.

4. A hydrodynamic brake comprising a rotor and a stator provided with coacting fluid pockets, means for supplying fluid to said pockets, means for varying the supply of fluid to said pockets, means for varying the rate of discharge of fluid radially directly from said pockets between said rotor and said stator, and common operating means for said last two means.

5. A hydrodynamic brake comprising a rotor and a stator provided with coacting fluid pockets, means for supplying fluid to said pockets, means for varying the supply of fluid to said pockets, and means for varying the space between said rotor and said stator.

6. A hydrodynamic brake comprising a rotor and a stator provided with coacting fluid pockets, means for supplying fluid to said pockets, means for varying the supply of fluid to said pockets, means for varying the space between said rotor and said stator, and common operating means for said last two means.

7. A hydrodynamic brake comprising a rotor and a stator member provided with coacting fluid pockets, means for supplying fluid to said pockets, means for varying said fluid supply, and means for effecting relative axial movement of said rotor and said stator member, whereby the supply of fluid to the brake may be cut off and said rotor and stator members may be moved relatively away from each other to quickly and substantially completely evacuate said pockets.

8. A hydrodynamic brake comprising a rotor and a stator member provided with coacting fluid pockets, means for variably supplying fluid to said pockets, means operative for effecting relative axial movement of said rotor and said stator member, and common operating means for said last two means.

9. A hydrodynamic brake comprising a rotor and a stator member provided with coacting fluid pockets, means for supplying fluid to said pockets, means for varying the supply of fluid to said pockets, and means for transmitting movement to said stator member to move it axially away from said rotor, whereby the supply of fluid to the brake may be cut off and said rotor and stator members may move relatively away from each other to quickly and substantially completely evacuate said pockets.

10. A hydrodynamic brake comprising a rotor and a stator member provided with coacting fluid pockets, means for supplying fluid to said pockets, means for varying the supply of fluid to said pockets, means for transmitting movement to said stator member to move it axially away from said rotor, and common operating means for said last two means.

11. A hydrodynamic brake comprising a rotor member and a stator member provided with coacting fluid pockets, means having threaded connection with said stator member, and means for effecting relative rotation of said stator member and said last named means to vary the space between said rotor and stator members.

12. A hydrodynamic brake comprising a rotor member and a stator member provided with coacting fluid pockets, one of said members being axially movable on a thread with respect to the other, and means for rotating said first named member.

13. A hydrodynamic brake comprising a rotor member and a stator member provided with coacting fluid pockets, one of said members being axially movable on a thread with respect to the other, means for rotating said first named member, and means for supplying fluid to said pockets.

14. A hydrodynamic brake comprising a rotor member and a stator member provided with coacting fluid pockets, one of said members being axially movable on a thread with respect to the other, means for supplying fluid to said pockets, means for varying the fluid supply, and means for rotating said first named member.

15. A hydrodynamic brake comprising a rotor member and a stator member provided with coacting fluid pockets, one of said members being axially movable on a thread with respect to the other, means for supplying fluid to said pockets, means for varying the fluid supply, means for rotating said first named member, and common operating means for said last two means.

16. A hydrodynamic brake comprising a casing, a rotor member and a stator member arranged in said casing and provided with coacting fluid pockets, means for supplying fluid to said pockets, means for discharging fluid from said casing, valve means for controlling the supply of fluid to said pockets, and means for supporting one of said members in said casing for relative axial movement with respect to the other member, whereby the supply of fluid to the brake may be cut off and said rotor and stator members may move relatively away from each other to quickly and substantially completely evacuate said pockets.

17. A hydrodynamic brake comprising a casing, a rotor member and a stator member arranged in said casing and provided with coacting fluid pockets, means for supplying fluid to said pockets, means for discharging fluid from said casing, valve means for controlling the supply of fluid to said pockets, means for supporting one of said members in said casing for relative axial movement with respect to the other member, and common operating means for axially moving said first named member and for operating said valve means.

18. A hydrodynamic brake comprising a casing, a rotor and a stator mounted in said casing and provided with coacting fluid pockets, said stator being threaded in said casing for axial movement toward and away from said rotor, and means for rotating said stator.

19. A hydrodynamic brake comprising a casing, a rotor and a stator mounted in said casing and provided with coacting fluid pockets, said stator being threaded in said casing for axial movement toward and away from said rotor, means for supplying fluid to said pockets, means for discharging fluid from said casing passing from said pockets between said rotor and said stator, and means for rotating said stator.

20. A hydrodynamic brake comprising a casing, a rotor and a stator mounted in said casing and provided with coacting fluid pockets, said stator being threaded in said casing for axial movement toward and away from said rotor, means for supplying fluid to said pockets, valve means for governing the supply of fluid to said pockets, means for discharging fluid from said casing passing between said rotor and said stator, and means for rotating said stator.

21. A hydrodynamic brake comprising a casing, a rotor and a stator mounted in said casing and provided with coacting fluid pockets, said stator being threaded in said casing for axial movement toward and away from said rotor, means for supplying fluid to said pockets, valve means for governing the supply of fluid to said pockets, means for discharging fluid from said casing passing between said rotor and said stator, means for rotating said stator, and common operating means for said last named means and said valve means.

22. A hydrodynamic brake comprising a casing, a rotor and a stator mounted in said casing and having coacting fluid pockets, said stator being supported in said casing for relative axial movement with respect to said rotor, said casing having a pair of fluid chambers, one communicating with said pockets to supply fluid thereto and the other communicating with said pockets to receive fluid passing radially outwardly therefrom between said rotor and said stator, and means for effecting axial movement of said stator with respect to said rotor.

23. A hydrodynamic brake comprising a casing, a rotor and a stator mounted in said casing and having coacting fluid pockets, said stator being supported in said casing for relative axial movement with respect to said rotor, said casing having a pair of fluid chambers, one communicating with said pockets to supply fluid thereto and the other communicating with said pockets to receive fluid passing radially outwardly therefrom between said rotor and said stator, means for governing the supply of fluid to said pockets, and means for effecting axial movement of said stator with respect to said rotor.

24. A hydrodynamic brake comprising a casing, a rotor and a stator mounted in said casing and having coacting fluid pockets, said stator being supported in said casing for relative axial movement with respect to said rotor, said casing having a pair of fluid chambers, one communicating with said pockets to supply fluid thereto and the other communicating with said pockets to receive fluid passing radially outwardly therefrom between said rotor and said stator, means for governing the supply of fluid to said pockets, means for effecting axial movement of said stator with respect to said rotor, and common operating means for said last two means.

25. A hydrodynamic brake comprising a casing, a rotor and a stator arranged in said casing and provided with coacting fluid pockets, said stator being threaded in said casing for axial movement toward and away from said rotor, said casing being provided with a pair of fluid chambers one communicating with said pockets to supply fluid thereto and the other communicating with said pockets to receive fluid therefrom passing radially outwardly between said rotor and said stator, and means for rotating said stator.

26. A hydrodynamic brake comprising a casing, a rotor and a stator arranged in said casing and provided with coacting fluid pockets, said stator being threaded in said casing for axial movement toward and away from said rotor, said casing being provided with a pair of fluid chambers one communicating with said pockets to supply fluid thereto and the other communicating with said pockets to receive fluid therefrom passing radially outwardly between said rotor and said stator, means for governing the supply of fluid to said pockets, and means for rotating said stator.

27. A hydrodynamic brake comprising a casing, a rotor and a stator arranged in said casing and provided with coacting fluid pockets, said stator being threaded in said casing for axial movement toward and away from said rotor, said casing being provided with a pair of fluid chambers one communicating with said pockets to supply fluid thereto and the other communicating with said pockets to receive fluid therefrom passing radially outwardly between said rotor and said stator, means for governing the supply of fluid to said pockets, means for rotating said stator, and common operating means for said last two means.

28. A hydrodynamic brake comprising a rotor and a stator provided with coacting fluid pockets, means for supplying fluid to said pockets, means for varying the space between said rotor and said stator, and means for reducing the supply of fluid to said pockets upon the increasing of the space between said rotor and said stator.

29. A hydrodynamic brake comprising a rotor and a stator provided with coacting fluid pockets, means for supplying fluid to said pockets, means for moving said stator axially away from said rotor, and means for reducing the supply of fluid to said pockets upon axial movement of said stator away from said rotor.

30. A hydrodynamic brake comprising a rotor and a stator provided with coacting fluid pockets, said stator having a passage for supplying fluid to said pockets, means for varying the space between said rotor and said stator, and means for reducing the rate of communication through said passage upon the increasing of the space between said rotor and said stator.

31. A hydrodynamic brake comprising a rotor and a stator provided with coacting fluid pockets, said stator having a passage for supplying fluid to said pockets, means for moving said stator axially away from said rotor, and means for reducing the rate of communication through said passage upon axial movement of said stator away from said rotor.

32. A hydrodynamic brake comprising a casing, a rotor and a stator arranged in said casing and provided with coacting fluid pockets, said stator being threaded in said casing for axial movement toward and away from said rotor and provided with gear teeth, and a pinion meshing with said gear teeth to rotate said stator.

33. A hydrodynamic brake comprising a casing, a rotor and a stator arranged in said casing and provided with coacting fluid pockets, said stator being threaded in said casing for axial movement toward and away from said rotor and provided with gear teeth, means for supplying fluid to said pockets, means for discharging fluid passing from said pockets radially outwardly between said rotor and said stator, and a pinion meshing with said gear teeth to rotate said stator.

34. A hydrodynamic brake comprising a casing, a rotor and a stator arranged in said casing and provided with coacting fluid pockets, said stator being threaded in said casing for axial movement toward and away from said rotor and provided with gear teeth, means for supplying fluid to said pockets, means for discharging fluid passing from said pockets radially outwardly between said rotor and said stator, means for governing the supply of fluid to said pockets, a pinion meshing with said gear teeth to rotate said stator, and means operative upon movement of said stator away from said rotor for reducing the supply of fluid to said pockets.

35. A hydrodynamic brake comprising a rotor and a stator provided with coacting fluid pockets, said stator being provided with an inlet conduit inclined with respect to the axis of rotation of said rotor and terminating within one of said stator pockets to supply fluid by induction incident to the movement of the fluid in said pockets, and means for varying the discharge of fluid radially from said pockets.

36. A hydrodynamic brake comprising a rotor and a stator provided with coacting fluid pockets, said stator being provided with an inlet conduit inclined with respect to the axis of rotation of said rotor and terminating within one of said stator pockets to supply fluid by induction incident to the movement of the fluid in said pockets, and means for varying the space between said rotor and said stator.

37. A hydrodynamic brake comprising a rotor and a stator provided with coacting fluid pockets, said stator being provided with an inlet conduit inclined with respect to the axis of rotation of said rotor and terminating within one of said stator pockets to supply fluid by induction incident to the movement of the fluid in said pockets, and means for moving said stator member axially with respect to said rotor.

38. A hydrodynamic brake comprising a rotor and a stator provided with coacting fluid pockets, said rotor being provided with an inlet conduit inclined with respect to the axis of rotation of said rotor and terminating within one of said stator pockets to supply fluid by induction incident to the movement of the fluid in said pockets, said conduit terminating substantially in the plane of the face of said stator member adjacent said rotor, and means for varying the space between said rotor and said stator.

ROBERT GRIFFIN DE LA MATER.